(12) United States Patent
McKean et al.

(10) Patent No.: US 7,480,909 B2
(45) Date of Patent: Jan. 20, 2009

(54) METHOD AND APPARATUS FOR COOPERATIVE DISTRIBUTED TASK MANAGEMENT IN A STORAGE SUBSYSTEM WITH MULTIPLE CONTROLLERS USING CACHE LOCKING

(75) Inventors: Brian Dennis McKean, Longmont, CO (US); Randall Alan Pare, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 10/084,214

(22) Filed: Feb. 25, 2002

(65) Prior Publication Data

US 2003/0163509 A1    Aug. 28, 2003

(51) Int. Cl.
*G06F 9/46* (2006.01)
*G06F 12/00* (2006.01)

(52) U.S. Cl. .................. 718/100; 718/102; 711/100
(58) Field of Classification Search .............. 718/100, 718/102, 106; 711/100, 114
See application file for complete search history.

(56) References Cited

U.S. PATENT DOCUMENTS

| | | | |
|---|---|---|---|
| 4,638,424 A | | 1/1987 | Beglin et al. |
| 4,771,375 A | | 9/1988 | Beglin et al. |
| 5,056,015 A | | 10/1991 | Baldwin et al. |
| 5,247,660 A | | 9/1993 | Ashcraft et al. |
| 5,410,667 A | * | 4/1995 | Belsan et al. ............ 711/114 |
| 5,410,697 A | | 4/1995 | Baird et al. |
| 5,493,668 A | | 2/1996 | Elko et al. |
| 5,537,574 A | | 7/1996 | Elko et al. |
| 5,634,072 A | | 5/1997 | Allen et al. |
| 5,742,792 A | | 4/1998 | Yanai et al. |
| 5,787,243 A | | 7/1998 | Stiffler et al. |
| 5,809,224 A | | 9/1998 | Schultz et al. |
| 5,860,159 A | | 1/1999 | Hagersten |
| 5,864,657 A | | 1/1999 | Stiffler et al. |
| 5,875,457 A | | 2/1999 | Shalit |
| 5,909,540 A | | 6/1999 | Carter et al. |
| 5,913,073 A | * | 6/1999 | LeCrone ................ 710/15 |
| 5,983,326 A | | 11/1999 | Hagersten et al. |
| 5,999,930 A | | 12/1999 | Wolff |
| 6,041,400 A | | 3/2000 | Ozcelik et al. |
| 6,058,489 A | | 5/2000 | Schultz et al. |
| 6,073,218 A | * | 6/2000 | DeKoning et al. .......... 711/150 |
| 6,078,990 A | | 6/2000 | Frazier |

(Continued)

OTHER PUBLICATIONS

Zhang et al., "A Design Methodology for Real-Time Systems to be Implemented on Multiprocessor Machines", Elsevier Science Inc., 1996, pp. 37-56.*

(Continued)

*Primary Examiner*—Thomas Lee
*Assistant Examiner*—Kenneth Tang
(74) *Attorney, Agent, or Firm*—William K. Konrad; Konrad Raynes & Victor LLP (57) ABSTRACT

The present invention provides a method and apparatus for cooperative distributed task management in a storage subsystem with multiple controllers using cache locking. The present invention distributes a task across a set of controllers acting in a cooperative rather than a master/slave nature to perform discrete components of the subject task on an as-available basis. This minimizes the amount of time required to perform incidental data manipulation tasks, thus reducing the duration of instances of degraded system performance.

8 Claims, 5 Drawing Sheets

U.S. PATENT DOCUMENTS

| | | |
|---|---|---|
| 6,119,115 A | 9/2000 | Barr |
| 6,185,629 B1* | 2/2001 | Simpson et al. .............. 710/10 |
| 6,466,991 B1* | 10/2002 | Moriyama et al. .......... 719/315 |
| 6,480,876 B2* | 11/2002 | Rehg et al. ................. 718/100 |
| 6,564,267 B1* | 5/2003 | Lindsay ...................... 709/250 |
| 6,862,668 B2* | 3/2005 | McKean et al. ............. 711/154 |
| 2002/0171652 A1* | 11/2002 | Perego ....................... 345/542 |
| 2002/0174318 A1* | 11/2002 | Stuttard et al. ................ 712/13 |
| 2003/0065836 A1* | 4/2003 | Pecone ........................ 710/62 |
| 2003/0236919 A1* | 12/2003 | Johnson et al. ............. 709/251 |

OTHER PUBLICATIONS

Silberschatz et al., "Operating System Concepts", 5th Edition, John Wiley & Sons, Inc., 1999, pp. 89-91, 598-599.*

* cited by examiner

METHOD AND APPARATUS FOR COOPERATIVE DISTRIBUTED TASK MANAGEMENT IN A STORAGE SUBSYSTEM WITH MULTIPLE CONTROLLERS USING CACHE LOCKING

CROSS REFERENCE TO RELATED APPLICATION

This application is related to the following co-pending and commonly-assigned U.S. patent application, which is hereby incorporated herein by reference in their respective entirety: "METHOD AND APPARATUS FOR USING CACHE COHERENCY LOCKING TO FACILITATE ON-LINE VOLUME EXPANSION IN A MULTI-CONTROLLER STORAGE SYSTEM" to McKean et al., having U.S. patent application Ser. No. 10/084,404.

BACKGROUND OF THE INVENTION

1. Field of the Invention

This invention relates in general to mass storage systems, and more particularly to a method and apparatus for cooperative distributed task management in a storage subsystem with multiple controllers using cache locking.

2. Description of Related Art

Typically, a computer stores data within devices such as hard disk drives, floppy drives, tape, compact disk, etc. These devices are otherwise known as storage devices. Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems. If a large amount of data requires storage, then multiple devices are connected to the computer and utilized to store the data.

A popular solution to mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled A Case for Redundant Arrays of Inexpensive Disks (RAID), reviews the fundamental concepts of RAID technology.

There are five "levels" of standard geometries defined in the Patterson publication. The simplest array, a RAID 1 system, comprises one or more disks for storing data and an equal number of additional "mirror" disks for storing copies of the information written to the data disks. The remaining RAID levels, identified as RAID 2, 3, 4 and 5 systems, segment the data into portions for storage across several data disks. One of more additional disks are utilized to store error check or parity information.

A computer typically does not require knowledge of the number of storage devices that are being utilized to store the data because another device, the storage subsystem controller, is utilized to control the transfer of data to and from the computer to the storage devices. The storage subsystem controller and the storage devices are typically called a storage subsystem and the computer is usually called the host because the computer initiates the requests for data from the storage devices. The storage controller directs data traffic from the host system to one or more non-volatile storage devices. The storage controller may or may not have an intermediary cache to stage data between the non-volatile storage device and the host system.

A caching controller (or caching storage controller) is a device which is capable of directing the data traffic from a host system to one or more non-volatile storage devices which uses an intermediary data storage device (the cache memory) to stage data between the non-volatile storage device and the host system. In general, the intermediary storage device is built out of RAM to allow a quicker access time to the data. Furthermore, it provides a buffer in which to allow exclusive-or (XOR) operations to be completed for RAID 5 operations.

Multiple active controllers are defined as a collection of storage controllers or caching storage controllers which work in a cooperative manner with each other. They provide the ability for recovering from a controller failure by allowing multiple paths to a volume set. The volume set is a contiguous range of randomly accessible sectors of data. For practical purposes, the sector numbering typically starts at 0 and goes to N, where N is the total number of sectors available to the host system. A data extent is a range of data within a volume set delineated by a starting sector and an ending sector. The volume set is broken up into a number of data extents which are not required to be of the equivalent sizes, but may not overlap. These concepts are used in the discussion of the background and the detailed description of embodiments of the invention, and apply to both.

Existing disk array control methodologies include incidental tasks that operate on user data, e.g., rebuilding volume set data to a spare disk drive after a disk drive failure, on-line expansion of a volume set, volume set parity checking, snapshot backup, volume set initialization, etc. Typically, in a dual active controller system, one controller acts as the master performing the task itself while locking the affected data to prevent access by the slave, or while holding the slave controller in reset during the task, and continuing to perform its primary mission of servicing user I/O requests. However, the performance of the system is diminished because of the time allotted to the primary controller to execute the task.

It can be seen that there is a need for a method and apparatus for cooperative distributed task management in a storage subsystem with multiple controllers using cache locking.

SUMMARY OF THE INVENTION

To overcome the limitations in the prior art described above, and to overcome other limitations that will become apparent upon reading and understanding the present specification, the present invention discloses a method and apparatus for cooperative distributed task management in a storage subsystem with multiple controllers using cache locking for cache synchronization.

The present invention solves the above-described problems by distributing a task across a set of controllers acting in a cooperative rather than a master/slave nature to perform discrete components of the subject task on an as-available basis. This minimizes the amount of time required to perform incidental data manipulation tasks, thus reducing the duration of instances of degraded system performance.

A system in accordance with the principles of the present invention includes a plurality of controllers for controlling an array of storage devices, each of the plurality of controllers comprising a CPU for controlling the operation of a controller, program memory for storing program instructions and variables for the operation of the CPU and cache memory for storing information related to the array of storage devices, wherein a controller of the plurality of controllers initiates a task to be performed, the controller initiating the task establishes a task coordination data object shared by the plurality of controllers, wherein the task coordination data object represents discrete partitions of the task to be performed and states for each partition, and wherein a free controller of the plurality of controllers selects a partition of the task available for processing as indicated by the states.

Other embodiments of a system in accordance with the principles of the invention may include alternative or optional additional aspects. One such aspect of the present invention is that the state indicates whether a partition is READY, IN PROGRESS, or COMPLETE.

Another aspect of the present invention is that a controller selects a partition by examining the partitions in a READY state and selecting at least one partition in the READY state to operate on.

Another aspect of the present invention is that a partition is in an IN PROGRESS state during processing.

Another aspect of the present invention is that a controller sets the partition selected for processing to a COMPLETE state upon completion of processing for a partition.

Another aspect of the present invention is that the states provide a semaphore-mechanism for allowing a controller to ascertain whether to acquire control over a partition.

Another aspect of the present invention is that the initiating controller is notified when all partition states are COMPLETE and performs whatever completion actions are required.

Another aspect of the present invention is that the a task coordination data object includes information about an operation to be performed and a data set to be operated on.

In another embodiment of the present invention, a mass storage array subsystem is disclosed. The mass storage array subsystem includes a plurality of storage devices, a backplane adapted to couple to said plurality of storage devices, and a plurality of controllers for controlling the plurality of storage devices, the plurality of controllers having a first interface to couple to a host system and a second interface adapted to couple to said backplane to communicate with said plurality of storage devices, wherein each of the plurality of controllers comprise a CPU for controlling the operation of a controller, program memory for storing program instructions and variables for the operation of the CPU and cache memory for storing information related to the array of storage devices, and wherein each of the plurality of controllers comprise a CPU for controlling the operation of a controller, program memory for storing program instructions and variables for the operation of the CPU and cache memory for storing information related to the array of storage devices, and wherein a controller of the plurality of controllers initiates a task to be performed, the controller initiating the task establishes a task coordination data object shared by the plurality of controllers, wherein the task coordination data object represents discrete partitions of the task to be performed and states for each partition, and wherein a free controller of the plurality of controllers selects a partition of the task available for processing as indicated by the states.

Another aspect of the mass storage array subsystem of the present invention is that the state indicates whether a partition is READY, IN PROGRESS, or COMPLETE.

Another aspect of the mass storage array subsystem of the present invention is that a controller selects a partition by examining the partitions in a READY state and selecting at least one partition in the READY state to operate on.

Another aspect of the mass storage array subsystem of the present invention is that a partition is in an IN PROGRESS state during processing.

Another aspect of the mass storage array subsystem of the present invention is that a controller sets the partition selected for processing to a COMPLETE state upon completion of processing for a partition.

Another aspect of the mass storage array subsystem of the present invention is that the states provide a semaphore-mechanism for allowing a controller to ascertain whether to acquire control over a partition.

Another aspect of the mass storage array subsystem of the present invention is that the initiating controller is notified when all partition states are COMPLETE and performs whatever completion actions are required.

Another aspect of the mass storage array subsystem of the present invention is that the a task coordination data object includes information about an operation to be performed and a data set to be operated on.

In another embodiment of the present invention, a method for cooperative distributed task management in a storage subsystem with multiple controllers using cache locking is disclosed. The method includes initiating by an initiating controller a task to be performed, establishing by the initiating controller a task coordination data object shared by the multiple controllers, wherein the task coordination data object represents discrete partitions of the task to be performed and states for each partition, and selecting by a free controller a partition of a task available for processing as indicated by the states.

Another aspect of the method of the present invention is that the method further includes indicating a state of a partition as being READY, IN PROGRESS, or COMPLETE.

Another aspect of the method of the present invention is that the selecting by a free controller is performed by examining the partitions in a READY state and selecting at least one partition in the READY state to operate on.

Another aspect of the method of the present invention is that a partition is in an IN PROGRESS state during processing.

Another aspect of the method of the present invention is that the method further includes setting by a controller a partition selected for processing to a COMPLETE state upon completion of processing for the partition.

Another aspect of the method of the present invention is that the states provide a semaphore-mechanism for allowing a controller to ascertain whether to acquire control over a partition.

Another aspect of the method of the present invention is that the method further includes notifying the initiating controller when all partition states are complete and performing completion actions that are required.

Another aspect of the method of the present invention is that the a task coordination data object includes information about an operation to be performed and a data set to be operated on.

In another embodiment of the present invention an article of manufacture comprising a program storage medium readable by a computer is disclosed. The medium tangibly embodies one or more programs of instructions executable by the computer to perform a method for cooperative distributed task management in a storage subsystem with multiple controllers using cache locking, wherein the method includes initiating by an initiating controller a task to be performed, establishing by the initiating controller a task coordination data object shared by the multiple controllers, wherein the task coordination data object represents discrete partitions of the task to be performed and states for each partition, and selecting by a free controller a partition of a task available for processing as indicated by the states.

Another aspect of the article of manufacture of the present invention is that the article of manufacture further includes indicating a state of a partition as being READY, IN PROGRESS, or COMPLETE.

Another aspect of the article of manufacture of the present invention is that the selecting by a free controller is performed by examining the partitions in a READY state and selecting at least one partition in the READY state to operate on.

Another aspect of the article of manufacture of the present invention is that a partition is in an IN PROGRESS state during processing.

Another aspect of the article of manufacture of the present invention is that the article of manufacture further includes setting by a controller a partition selected for processing to a COMPLETE state upon completion of processing for the partition.

Another aspect of the article of manufacture of the present invention is that a free controller selects a partition by examining the partitions in a READY state and selecting at least one to operate on.

Another aspect of the article of manufacture of the present invention is that the article of manufacture further includes notifying the initiating controller is notified when all partition states are complete and performs whatever completion actions required.

Another aspect of the article of manufacture of the present invention is that the task coordination data object includes information about an operation to be performed and a data set to be operated on.

In another embodiment of the present invention, a mass storage controller system is disclosed, wherein the mass storage controller system includes a plurality of intermediate controller means for controlling an array of storage devices, each of the plurality of controllers comprising CPU means for controlling the operation of a controller, program memory means for storing program instructions and variables for the operation of the CPU and cache memory means for storing information related to the array of storage devices, wherein an intermediate controller means of the plurality of intermediate controller means initiates a task to be performed, the intermediate controller means initiating the task establishes a task coordination data object shared by the plurality of intermediate controller means controller means, wherein the task coordination data object represents discrete partitions of the task to be performed and states for each partition, and wherein a free intermediate controller means selects a partition of the task available for processing as indicated by the states.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for cooperative distributed task management in a storage subsystem with multiple controllers using cache locking. The present invention distributes a task across a set of controllers acting in a cooperative rather than a master/slave nature to perform discrete components of the subject task on an as-available basis. This minimizes the amount of time required to perform incidental data manipulation tasks, thus reducing the duration of instances of degraded system performance.

Figure 1:
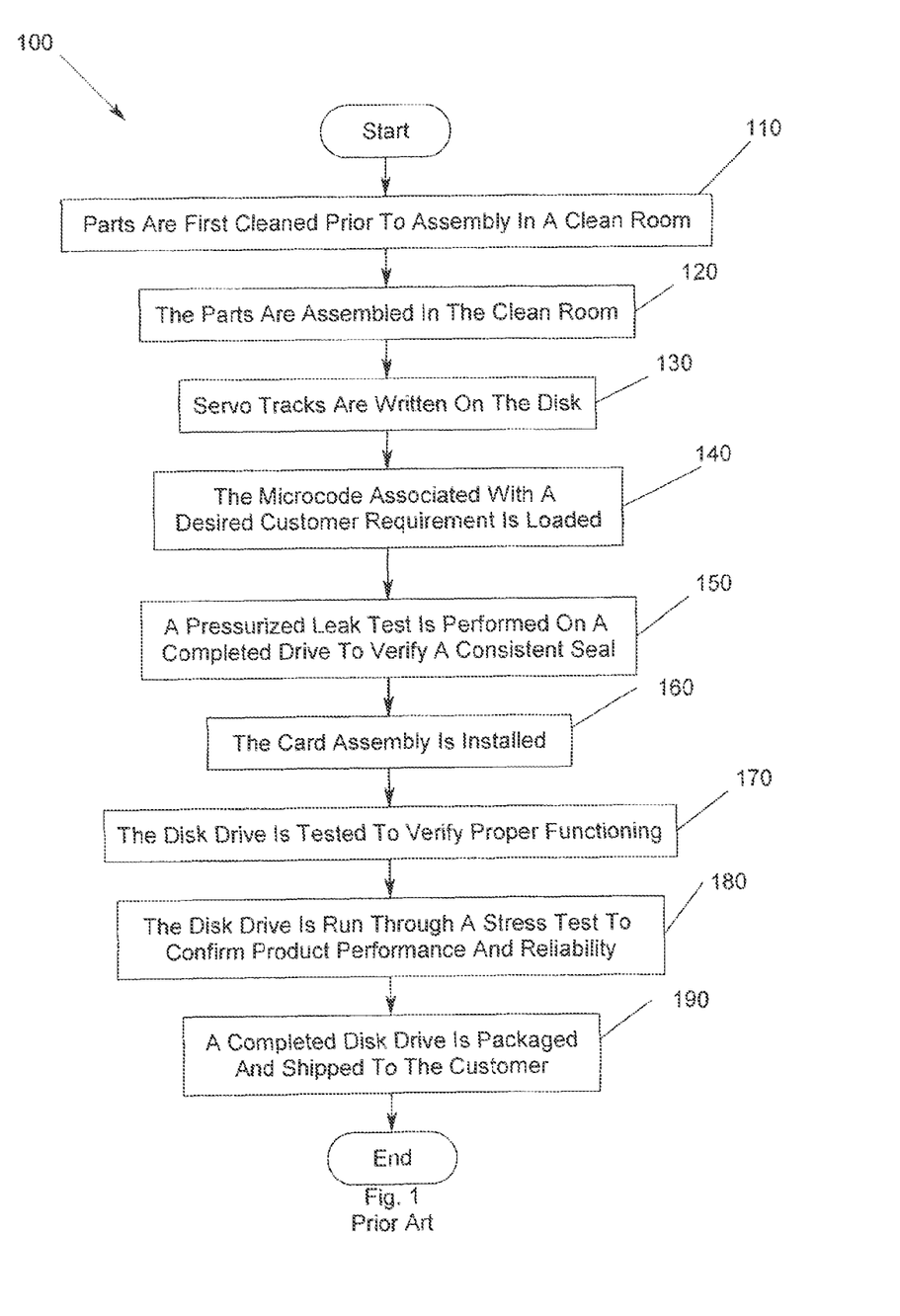
FIG. 1 illustrates a block diagram of a typical RAID storage subsystem, having multiple active disk array controllers, in which the methods and associated apparatus of the present invention may be applied.

FIG. 1 illustrates a block diagram of a typical RAID storage subsystem 100, having multiple active disk array controllers 118 and 120, in which the methods and associated apparatus of the present invention may be applied. RAID storage subsystem 100 includes at least one pair of multiple active disk array controllers 118 and 120 that are in turn connected to disk array 108 via bus (or busses) 150 and to host computer 102 via bus 154. Disk array 108 is comprised of a plurality of disk drives 110. One of ordinary skill in the art will readily recognize that interface bus 150 between the multiple active disk array controllers 118 and 120 and disk array 108 (including disk drives 110) may be any of several industry standard interface busses including SCSI, IDE, EIDE, IPI, Fiber Channel, SSA, PCI, etc. Circuits (not shown) within multiple active disk array controllers 118 and 120 appropriate to controlling bus 150 are well known to those of ordinary skill in the art. Interface bus 154 between multiple active disk array controllers 118 and 120 and host computer 102 may be any of several standard industry interface busses including SCSI, Ethernet (LAN), Token Ring (LAN), etc. Circuits (not shown) within multiple active disk array controllers 118 and 120 appropriate to controlling bus 154 are well known to those of ordinary skill in the art.

As shown in FIG. 1, RAID storage subsystem 100 may be utilized to implement any of the well-known RAID levels (e.g. levels 0-5). The various RAID levels are distinguished by the manner in which the associated RAID controller logically subdivides or partitions the disk drives 110 in disk array 108. For example, when implementing RAID level 1 features, approximately half of the disk drives 110 of disk array 108 are used to store and retrieve data while the other half is operated by the RAID controller to mirror the data storage contents of the first half. Further, when implementing RAID level 4 features, the RAID controller utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels.

Active controller 118 includes CPU 112, program memory 114 (e.g. ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices. The data structures of the present invention are embodied within cache memory 116 and are created and manipulated by methods operable within CPU 112. Active controller 120 is identical to active controller 118 and is comprised of CPU 122, program memory 124 and cache memory 126, all interconnected via memory bus 162.

To permit each of the multiple active controllers 118, 120 to communicate with the other, the multiple active disk array controllers 118 and 120 are interconnected via shared bus 156. The multiple active disk array controllers 118 and 120 are interchangeable devices within RAID subsystem 100 to permit easy replacement, including hot swap, of a defective controller. One of ordinary skill in the art will readily recognize that the block diagram of FIG. 1 is intended only as an exemplary design which may embody the present invention. Many alternate controller and subsystem designs may embody the methods and associated apparatus and structures of the present invention.

Each CPU 112 or 122 within each active controller 118 or 120 can manipulate the cache memory 116 or 126 of the other controller via shared bus 156. The active controllers 118, 120 may be utilized in several modes depending upon software and control methods operable within CPU 112 and 122. In the dual-active controller pair mode of operation, each cache memory 116 and 126 is logically subdivided by control methods operable within the CPUs 112 and 122 into a first section for use by the corresponding CPU (attached through their respective memory bus 152 and 162) and a second section for use by the alternate controller (via shared bus 156).

In the dual-active controller pair mode, each of the pair of multiple active disk array controllers 118 and 120 is active in parallel with the other to maintain cache information in its own cache as well as the cache of the alternate controller. Each controller may control its own particular volume sets (disk drive groups within disk array 108).

In all modes of operation of multiple controller systems, cache memories contain signature data which associate the cache memory contents with a particular RAID subsystem. A controller having a cache memory the content of which is associated with the RAID subsystem in which it is presently operating, as determined by a match of the signature information, is referred to herein as a "native" controller. Conversely, a controller having a cache memory the content of which is not associated with the RAID subsystem in which it is presently operating, as determined by a mismatch of the signature information, is referred to herein as a "foreign" controller.

The above-mentioned fault tolerant data protection schemes employed in drive arrays, also provide a means for rebuilding a physical replacement drive should one of the main physical drives of the drive array fail. The remaining main drives of the array provide the information necessary to rebuild the physical replacement drive from the remaining drives. For a RAID 1 system, the physical replacement drive can be rebuilt from the failed disk drive's mirror drive. For a RAID 4 or RAID 5 system, a logical block on the replacement drive is rebuilt by XORing the other logical blocks of its stripe, and this process is repeated until all logical blocks of the replacement drive are rebuilt.

Known volume set rebuild methodologies in a dual active controller environment assign the rebuild task to a single controller. For example, in a dual active controller system, one controller acts as the master performing a task by itself while locking the affected data to prevent access by the slave, or by holding the slave controller in reset during the task and continuing to perform its primary mission of servicing user I/O requests. This master controller performs the task in tandem with its mission task of performing user input/output operations.

However, the performance of the system is diminished because of the time allotted to the primary controller to perform the task. For example, during the rebuild operation, the performance of this controller is decreased because of the time allotted to the rebuild function, and the duration of the rebuild is lengthened due to the concurrent I/O. The slave controller's performance is not appreciably affected by this activity and the slave controller may, in fact, be completely idle at any time during the rebuild thereby wasting processing resources. Moreover, other tasks must also be performed by the primary controller, e.g., event logging, seek sorting and other cache management.

Thus, according to the present invention, a method and apparatus for cooperative distributed task management in a storage subsystem with multiple controllers using cache locking is disclosed. By distributing a task across a set of controllers, the set of controller may act in a cooperative rather than a master/slave nature to perform discrete components of the subject task on an as-available basis. Accordingly, the present invention is not meant to be limited to any particular modes of operation of multiple controller systems, such as dual active controller systems. Further, the present invention is not meant to be limited to any type of controller system, i.e., disk, tape, etc.

Figure 2:
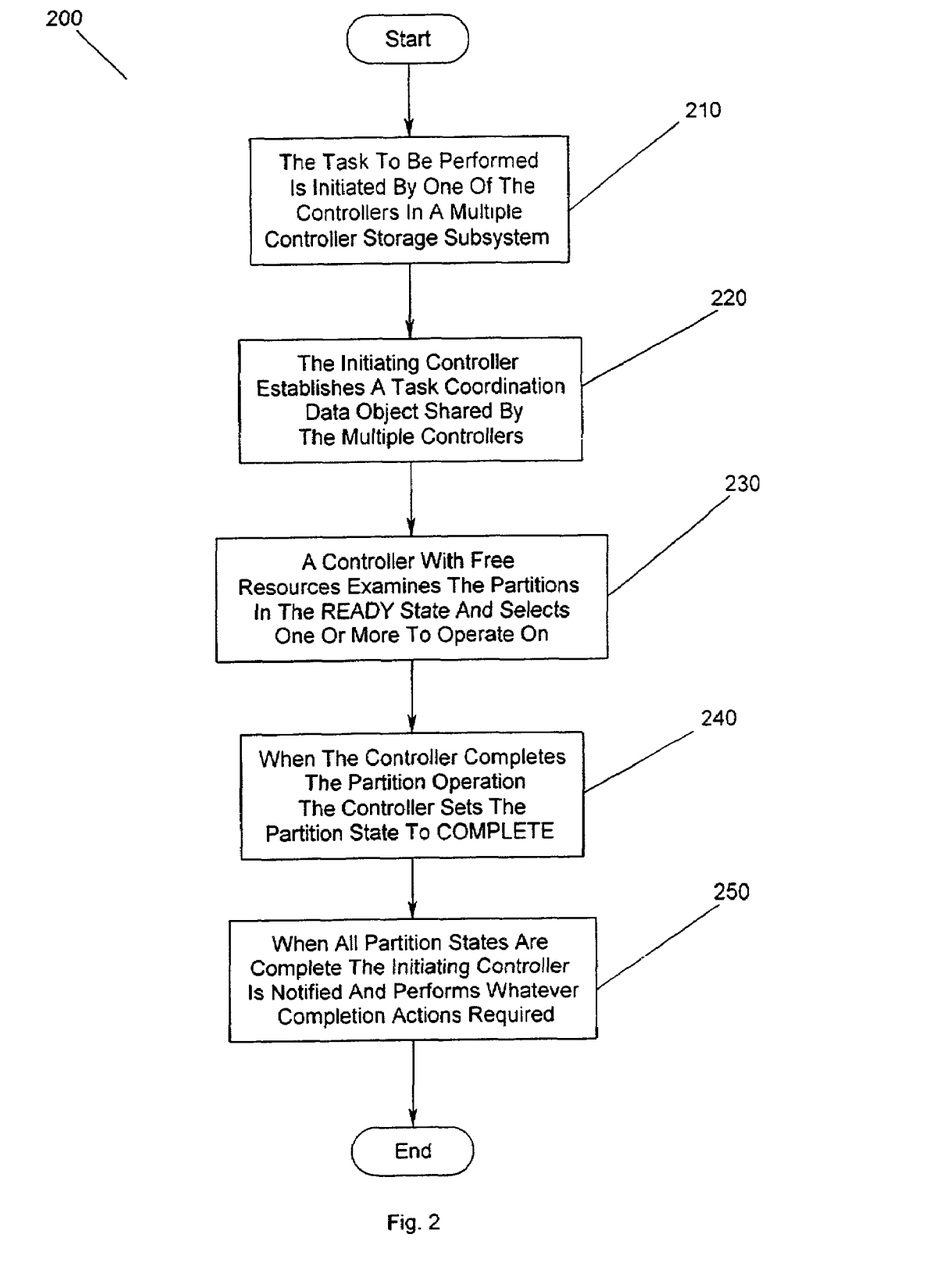
FIG. 2 illustrates a flow chart of the method for cooperative distributed task management in a storage subsystem with multiple controllers using cache locking according to the present invention.

FIG. 2 illustrates a flow chart of the method for cooperative distributed task management in a storage subsystem with multiple controllers using cache locking according to the present invention. The task to be performed is initiated by one of the controllers in a multiple controller storage subsystem 210. The initiating controller establishes a task coordination data object shared by the multiple controllers 220. The subject task represented by the task coordination object is decomposed into discrete partitions representing discrete portions of the task that may be performed, for example, independently by any of a plurality of controllers in the storage subsystem. The task coordination object thus includes information about the task to be performed and the partitions that make up the task. The information for each task partition includes a state variable that indicates whether the partition is READY, IN PROGRESS, or COMPLETE. Thus, the controllers use a semaphore-mechanism to ascertain the state of individual partitions and to acquire control over the partitions.

A controller with free resources examines the partitions in the READY state and selects one or more to operate on 230. During the operations, the partition is in the IN PROGRESS state. When the controller completes the partition operation the controller sets the partition state to COMPLETE 240.

Figure 3:
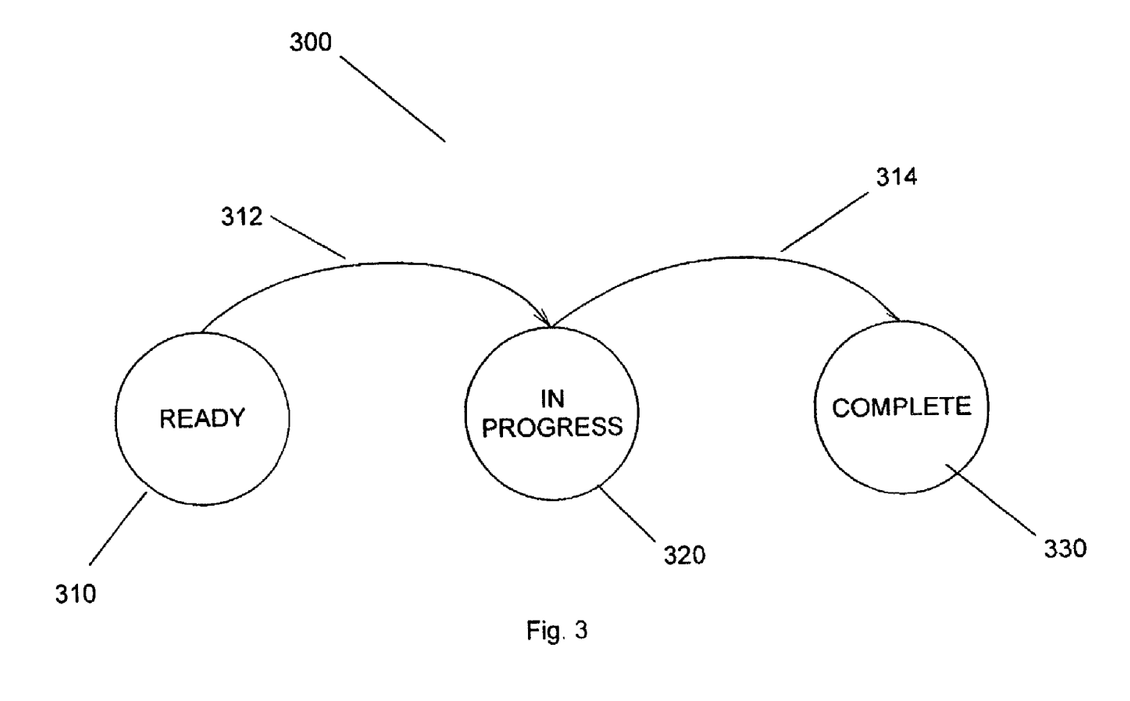
FIG. 3 illustrates a state diagram for a partition of a task.

FIG. 3 illustrates a state diagram for a partition of a task. FIG. 3 shows that a partition starts in the READY state 310. A transition 312 moves the state of the partition to an IN PROGRESS state 320. When the controller completes the partition operation a transition 314 sets the partition to a COMPLETE state 330.

Returning to FIG. 2, when all partition states are complete the initiating controller is notified and performs whatever completion actions required 250, e.g. notification to an operator. In this fashion the controllers cooperate in the execution of the task, each controller performing steps of task independently of the other at whatever rate it is capable. In addition to state information, the partition shared data object may include information about the operation to be performed and the data set to be operated on.

Shared multiple raid controller access to common storage devices needs to be coordinated. In a system that includes a plurality of RAID control modules connected to a common shared LUN, each of a plurality of RAID controllers may actively process different I/O requests on a common shared subset of disk drives. One controller may be designated as primary with respect to a particular shared subset of disk drives. The plurality of RAID controllers may then exchange messages over a communication medium to coordinate concurrent access to the shared subset of disk drives through the primary controller. The messages exchanged may include semaphore lock and release requests to coordinate exclusive access during critical operations as well as cache and meta-cache data to maintain cache coherency between the plurality of the RAID controllers with respect to the common shared subset of disk drives. These messages may be exchanged via any of several well known communication mediums, including, a shared memory common to the plurality of controllers and the communication bus connecting the shared subset of disk drives to each of the plurality of controllers.

According to the present invention, cache synchronization is used to maintain data integrity while performing the non-I/O tasks distributed across multiple controllers. One possible mechanism to provide cache synchronization is a software-based cache locking mechanism as described above. Shared data objects for the partitioned task management therefore may use a cache synchronization mechanism to maintain data integrity while executing the task partition.

Figure 4:
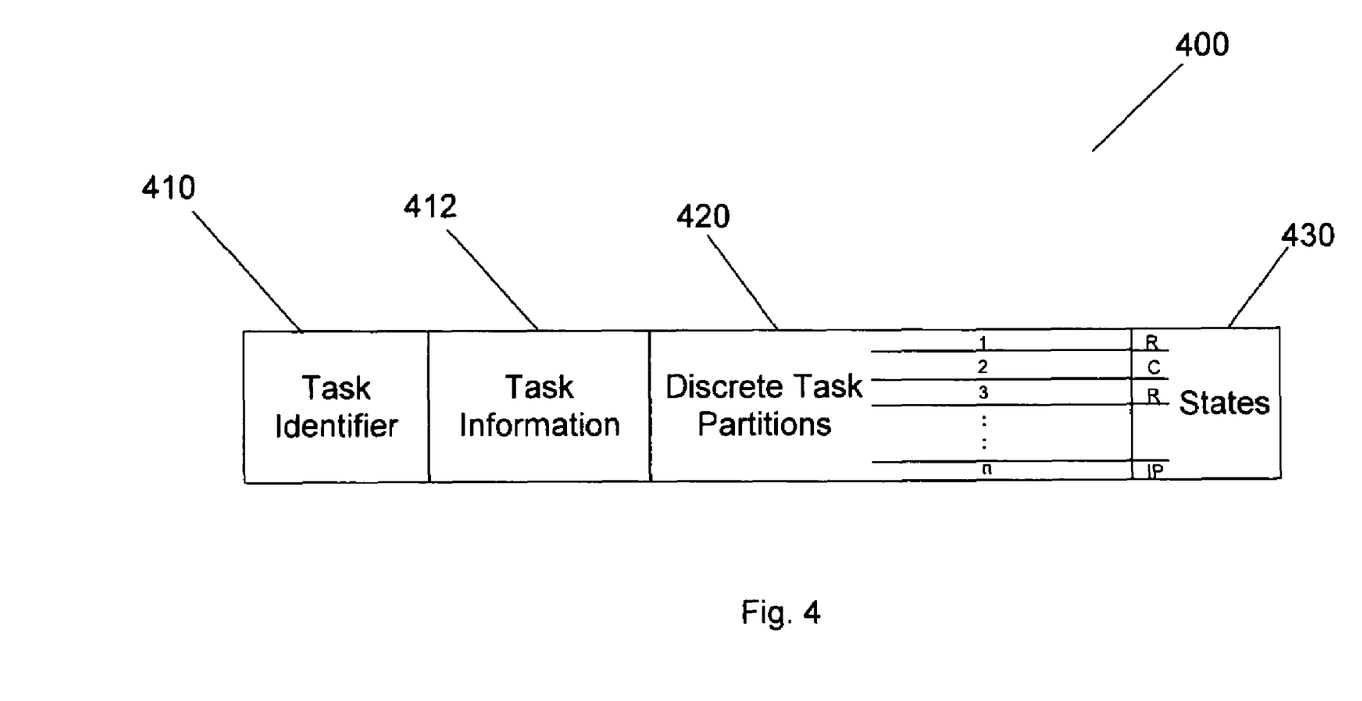
FIG. 4 illustrates one embodiment of a task coordination data object according to the present invention.

FIG. 4 illustrates one embodiment of a task coordination data object 400 according to the present invention. In FIG. 4, the task coordination data object includes a task identifier 410. Associated with a task identifier is task information 412 and discrete task partitions 420 representing discrete portions of the task that may be performed independently by any of a plurality of the system controllers. For each of the task partitions, state information 430 is provided to indicate whether a task partition is in a READY, IN PROGRESS, or COMPLETE state.

Figure 5:
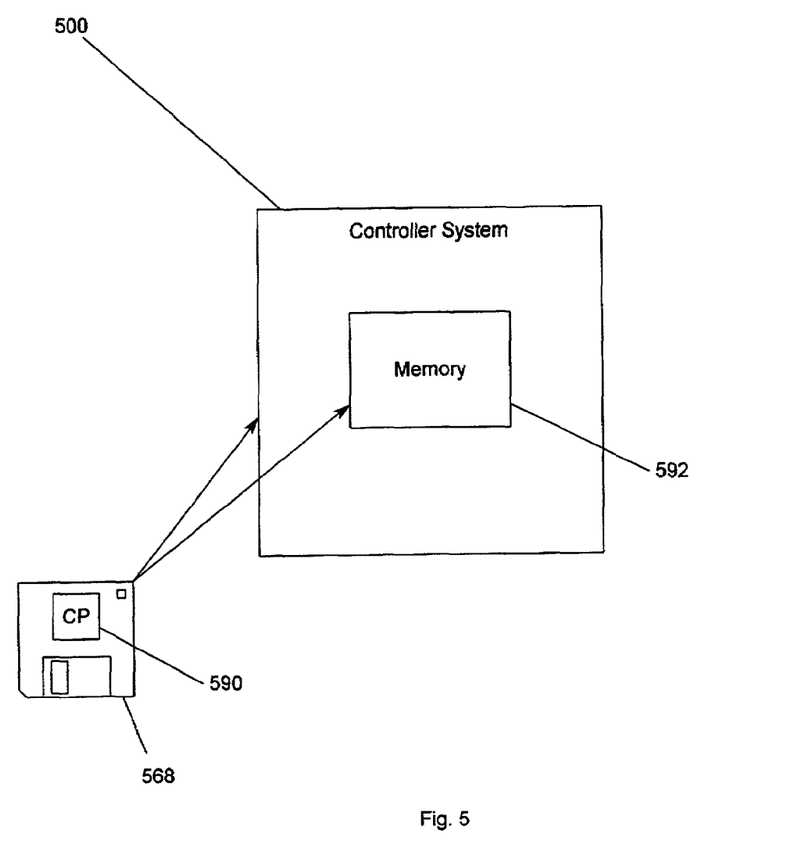
FIG. 5 illustrates a controller system according to the present invention, wherein the process illustrated with reference to FIGS. 2-4 may be tangibly embodied in a computer-readable medium or carrier.

FIG. 5 illustrates a controller system 500 according to the present invention, wherein the process illustrated with reference to FIGS. 2-4 may be tangibly embodied in a computer-readable medium or carrier, e.g. one or more of the fixed and/or removable data storage devices 568 illustrated in FIG. 5, or other data storage or data communications devices. A computer program 590 expressing the processes embodied on the removable data storage devices 568 may be loaded into the memory 592 or into the controller system 500, e.g., in a processor (not shown), to configure the controller system 500 of FIG. 5, for execution. The computer program 590 comprise instructions which, when read and executed by the controller 500 of FIG. 5, causes the controller system 500 to perform the steps necessary to execute the steps or elements of the present invention In summary, the present invention provides a method and apparatus for cooperative distributed task management in a storage subsystem with multiple controllers using cache locking. By distributing a task across a set of controllers, the set of controllers may act in a cooperative rather than a master/slave nature to perform discrete components of the subject task on an as-available basis. This minimizes the amount of time required to perform incidental data manipulation tasks, thus reducing the duration of instances of degraded system performance. For example, in the rebuild case, each partition may represent a logical volume or, more granularly, a set of one or more data stripes of the logical volume. When a controller schedules time for the rebuild to proceed, it acquires ownership of the data object associated with an available partition of the task. In this manner a less busy controller may execute several steps of the rebuild process in the time that the busier controller may execute only one.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for cooperative distributed task management in a storage subsystem with multiple controllers, comprising:
    initiating by an initiating controller a task to be performed;
    establishing by the initiating controller a task coordination data object shared by the multiple controllers, wherein the task coordination data object comprises discrete partitions of the task comprising task instructions and states for each partition of the task, task instructions for each partition of the task capable of being completed separately by one of the plurality of controllers;
    indicating a state of a partition as being READY, IN PROGRESS, or COMPLETE;
    selecting by a free controller an available partition of the task separately and independently of the other controllers as indicated by the states for each partition of task instructions wherein the selecting by a free controller is performed by examining the partitions in a READY state and selecting at least one partition in the READY state to operate on; and
    completing by the free controller the selected partition of the task separately and independently of the other controllers as indicated by the states for each partition of task instructions.

2. The method of claim 1, wherein a partition is in an IN PROGRESS state during processing.

3. The method of claim 2 further comprising setting by a controller a partition selected for processing to a COMPLETE state upon completion of processing for the partition.

4. The method of claim 1, wherein a partition is in an IN PROGRESS state during processing.

5. The method of claim 1 further comprising setting by a controller a partition selected for processing to a COMPLETE state upon completion of processing for the partition.

6. The method of claim 1 wherein the states provide a semaphore-mechanism for allowing a controller to ascertain whether to acquire control over a partition.

7. The method of claim 1 further comprising notifying the initiating controller when all partition states are complete and performing completion actions that are required.

8. The method of claim 1, wherein the task coordination data object includes information about an operation to be performed and a data set to be operated on.

* * * * *